(12) United States Patent
Hiro

(10) Patent No.: US 8,163,821 B2
(45) Date of Patent: Apr. 24, 2012

(54) TIRE RUBBER COMPOSITION AND HEAVY-LOAD TIRE

(75) Inventor: Masataka Hiro, Kobe (JP)

(73) Assignee: Sumitomo Rubber Industries, Ltd., Kobe-Shi Hyogo (JP)

( * ) Notice: Subject to any disclaimer, the term of this patent is extended or adjusted under 35 U.S.C. 154(b) by 0 days.

(21) Appl. No.: 13/048,914

(22) Filed: Mar. 16, 2011

(65) Prior Publication Data

US 2011/0230613 A1    Sep. 22, 2011

(30) Foreign Application Priority Data

Mar. 17, 2010 (JP) ................... 2010-061445
Apr. 30, 2010 (JP) ................... 2010-105530

(51) Int. Cl.
*C08L 89/00* (2006.01)
*C08K 5/49* (2006.01)

(52) U.S. Cl. .......... 524/115; 524/17; 524/534; 524/267; 524/261; 152/209.1

(58) Field of Classification Search .......... 524/534, 524/267, 261, 115, 17; 152/209.1
See application file for complete search history.

(56) References Cited

U.S. PATENT DOCUMENTS

| | | | |
|---|---|---|---|
| 2006/0252879 A1 | 11/2006 | Tanaka et al. | |
| 2009/0000721 A1* | 1/2009 | Imoto et al. | 152/525 |
| 2010/0206444 A1* | 8/2010 | Kawasaki | 152/209.1 |

FOREIGN PATENT DOCUMENTS

| | | | |
|---|---|---|---|
| JP | 8-12814 A | | 1/1996 |
| JP | 11-12306 A | | 1/1999 |
| JP | 2000-344955 A | | 12/2000 |
| JP | 2001-114939 A | | 4/2001 |
| JP | 2004-262973 A | | 9/2004 |
| JP | 2005-82766 A | | 3/2005 |
| JP | 2005-126604 A | | 5/2005 |
| JP | 2005-325206 A | | 11/2005 |
| JP | 2006-16622 A | | 1/2006 |
| JP | 2006-152211 | * | 6/2006 |
| JP | 2007-169431 A | | 7/2007 |
| JP | 2008-214608 A | | 9/2008 |
| JP | 2009-262835 A | | 11/2009 |
| WO | WO 2005/012365 A1 | | 2/2005 |

* cited by examiner

*Primary Examiner* — Ling Choi

(74) *Attorney, Agent, or Firm* — Birch, Stewart, Kolasch & Birch, LLP

(57) ABSTRACT

The present invention provides: a rubber composition for a tire that achieves both good fuel economy and abrasion resistance, and also achieves good degradation resistance and processability; and a heavy-load tire having a tread produced therefrom. The present invention relates to a rubber composition for a tire, comprising a rubber component that contains a modified natural rubber having a phosphorus content of 200 ppm or less and a butadiene rubber, wherein the amount of the modified natural rubber is 60 to 95% by mass and the amount of the butadiene rubber is 5 to 40% by mass, based on 100% by mass of the rubber component.

17 Claims, No Drawings

TIRE RUBBER COMPOSITION AND HEAVY-LOAD TIRE

TECHNICAL FIELD

The present invention relates to a rubber composition for a tire, and to a heavy-load tire using the same for a tread.

BACKGROUND ART

The fuel cost increase and introduction of environmental regulations have increased the demand for improving fuel economy of automobiles in recent years. Rubber compositions for producing a tread, which occupies a larger portion of a tire among various tire components, have been required to be excellent in fuel economy.

Known as a method for improvement in fuel economy is a method in which the amount of a filler such as carbon black is decreased. However, the decrease in the amount of a filler tends to reduce rubber strength and deteriorate abrasion resistance; therefore, it has been difficult to achieve both fuel economy and abrasion resistance at high levels. In the rubber compositions, degradation resistance has been demanded as well as fuel economy and abrasion resistance. A method has thus been required in which both good fuel economy and abrasion resistance are achieved while good degradation resistance is maintained.

Patent Documents 1 to 3 propose reducing rolling resistance with modified diene rubbers such as modified butadiene rubber and modified styrene butadiene rubber. Patent Documents 4 and 5 propose improving rubber strength with a natural rubber in which proteins have been removed. However, there is still room for improvement in that both fuel economy and abrasion resistance need to be achieved at higher levels while good degradation resistance is maintained.

In respect of tires (particularly heavy-load tires), a method in which natural rubber or butadiene rubber is used as a rubber component is common for improvement in fuel economy. Known as a method for further improvement in fuel economy are a method in which silica is used as a filler and a method in which the amount of a filler is decreased. However, these methods may reduce rubber strength and fail to maintain good abrasion resistance. In particular, rubber compositions for heavy-load tires need high rubber strength and it is therefore difficult to apply the methods to these rubber compositions. In addition, conventional silane coupling agents used in combination with silica tend, for example, to increase viscosity upon mixing and to reduce scorch time, and thus may cause any adverse effects on processability. Accordingly, a method that achieves well-balanced improvement in fuel economy, abrasion resistance, and processability is required.

Patent Document 6 discloses a rubber composition prepared using natural rubber and epoxidized natural rubber in order to increase the content of non-petroleum resources. However, the rubber composition still has room for well-balanced improvement in fuel economy, abrasion resistance, and processability.

Patent Document 1: JP 2001-114939 A
Patent Document 2: JP 2005-126604 A
Patent Document 3: JP 2005-325206 A
Patent Document 4: JP H08-12814 A
Patent Document 5: JP H11-12306 A
Patent Document 6: JP 2007-169431 A

SUMMARY OF THE INVENTION

The present invention aims to provide a rubber composition for a tire, which solves the above problems so as to achieve both good fuel economy and abrasion resistance, and also to achieve good degradation resistance and processability. It is also an aim of the present invention to provide a heavy-load tire having a tread produced therefrom.

The present invention relates to a rubber composition for a tire, comprising a rubber component that contains a modified natural rubber having a phosphorus content of 200 ppm or less and a butadiene rubber, wherein the amount of the modified natural rubber is 60 to 95% by mass and the amount of the butadiene rubber is 5 to 40% by mass, based on 100% by mass of the rubber component.

The modified natural rubber preferably has a gel content of 20% by mass or less, the gel content being determined as the amount of a toluene-insoluble matter.

The modified natural rubber preferably has no phospholipid peak in a range of −3 to 1 ppm in a $^{31}$P NMR measurement of a chloroform extract thereof, so that it contains substantially no phospholipids.

The modified natural rubber preferably contains 0.3% by mass or less of nitrogen.

The modified natural rubber is preferably produced by saponifying natural rubber latex.

The butadiene rubber is preferably a modified butadiene rubber.

The butadiene rubber is preferably modified by a compound represented by formula (1):

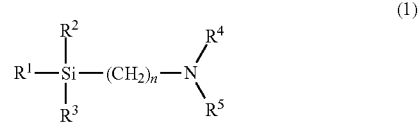

wherein $R^1$, $R^2$, and $R^3$ are the same or different, and each of these represents an alkyl group, an alkoxy group, a silyloxy group, an acetal group, a carboxyl group, a mercapto group, or a derivative thereof, $R^4$ and $R^5$ are the same or different, and each of these represents a hydrogen atom, an alkyl group, or a cyclic ether group, and n represents an integer.

The butadiene rubber is preferably synthesized with a rare earth catalyst.

The butadiene rubber synthesized with the rare earth catalyst preferably has a cis content of 95% by mass or more and a vinyl content of 1.0% by mass or less.

The rubber composition preferably further comprises: silica and a silane coupling agent, wherein the silane coupling agent is a copolymer comprising units A represented by formula (2) and units B represented by formula (3), and the proportion of the units B is 1 to 70 mol % of the total molar amount of the units A and the units B, and the amount of the silica is 10 to 60 parts by mass per 100 parts by mass of the rubber component:

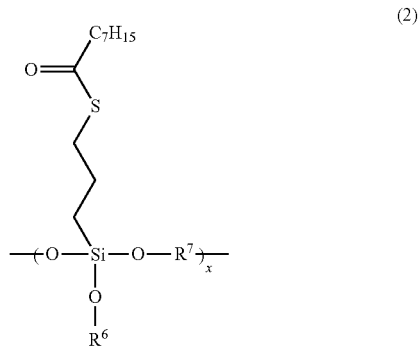

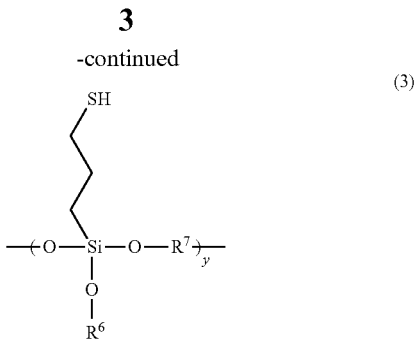

(3)

wherein x and y each are an integer of one or more, $R^6$ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group obtained by replacing a terminal hydrogen of the alkyl or alkenyl group with a hydroxy or carboxyl group, $R^7$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and $R^6$ and $R^7$ may form a ring structure together.

The rubber composition preferably further comprises carbon black.

The rubber composition is preferably used for a tread of a heavy-load tire.

The present invention also relates to a heavy-load tire, comprising a tread produced from the rubber composition.

According to the present invention, the rubber composition for a tire comprises a rubber component containing predetermined amounts of a modified natural rubber with a small phosphorus content and a butadiene rubber. Hence, the use of the rubber composition for a tread of a heavy-load tire provides a heavy-load tire that achieves both good fuel economy and abrasion resistance, and also achieves good degradation resistance and process ability.

BEST MODE FOR CARRYING OUT THE INVENTION

The rubber composition for a tire of the present invention includes a modified natural rubber (HPNR) with a small phosphorus content and a butadiene rubber (BR). The use of a modified natural rubber (HPNR) with reduced or no levels of proteins, gel fraction, and phospholipids contained in natural rubber (NR) leads to further improvement in fuel economy compared with the use of NR. In addition, Mooney viscosity can be reduced so that good processability can be obtained. However, anti-degradation components in NR are removed as well in synthesis of HPNR by NR saponification or the like treatment. This causes early degradation of rubber, resulting in lowering of the performances such as degradation resistance and abrasion resistance. In contrast, since the present invention uses HPNR and BR together as a rubber component, both fuel economy and abrasion resistance can be improved and these two performances can be favorably achieved. In addition, good degradation resistance can be maintained, resulting in well-balanced improvement in fuel economy, abrasion resistance, and degradation resistance. Further, good processability can be achieved.

The modified natural rubber (HPNR) has a phosphorus content of 200 ppm or less. A phosphorus content of more than 200 ppm tends to cause an increase in the gel content during storage and an increase in the tans of the vulcanized rubber composition. The phosphorus content is preferably 150 ppm or less, and more preferably 100 ppm or less. Here, the phosphorus content can be measured by a conventional method such as ICP emission spectrometry. The phosphorus is derived from phospholipids (phosphorus compounds).

The modified natural rubber preferably has a gel content of 20% by mass or less, more preferably 10% by mass or less, and further preferably 7% by mass or less. A gel content of more than 20% by mass tends to result in reduced processability such as increased Mooney viscosity. The gel content refers to the amount determined as a matter insoluble in toluene which is a non-polar solvent. Hereinafter, this content is also referred to as simply "gel content" or "gel fraction". The gel content is determined by the following method. First, a natural rubber sample is immersed in dehydrated toluene and is allowed to stand for one week in a dark place protected from light. Next, the toluene solution is centrifuged for 30 minutes at $1.3 \times 10^5$ rpm so that a toluene-insoluble gel fraction and a toluene-soluble fraction are separated from each other. The toluene-insoluble gel fraction is mixed with methanol to be solidified, and then dried. Finally, the gel content is determined from the ratio of the mass of the dried gel fraction to the mass of the original sample.

The modified natural rubber preferably contains substantially no phospholipids. Here, the phrase "contains substantially no phospholipids" means that no phospholipid peak is present in a range of –3 to 1 ppm in a $^{31}$P NMR measurement of an extract obtained by chloroform extraction from a natural rubber sample. The phospholipid peak present in a range of –3 to 1 ppm refers to a peak corresponding to a phosphate ester structure in the phosphorus component of phospholipids.

The modified natural rubber preferably contains 0.3% by mass or less, and more preferably 0.15% by mass or less, of nitrogen. A nitrogen content of more than 0.3% by mass tends to cause an increase in Mooney viscosity during storage. The nitrogen is derived from proteins. The nitrogen content can be determined by a conventional method such as the Kjeldahl method.

The modified natural rubber may be produced, for example, by a method in which natural rubber latex is saponified with an alkali, a rubber coagulated therefrom after the saponification is washed, and then the washed rubber is dried. The saponification is performed by adding an alkali and optionally a surfactant to natural rubber latex and allowing the mixture to stand for a certain period at a predetermined temperature. Here, the mixture may optionally be stirred or subjected to other operations. The production method removes phosphorus compounds, which are separated in the saponification, by washing, and thereby can reduce the phosphorus content in natural rubber. Further, the saponification degrades proteins in natural rubber, and thereby can reduce the nitrogen content in natural rubber. In the present invention, the saponification can be performed by adding an alkali to natural rubber latex, and the addition to natural rubber latex advantageously leads to efficient saponification.

Natural rubber latex is sap extracted from hevea trees and contains components such as water, proteins, lipids, and inorganic salts as well as a rubber component. The gel fraction in rubber is thought to be derived from a complex of various impurities in rubber. The latex used in the present invention may be raw latex taken from hevea trees by tapping the trees, or purified latex concentrated by centrifugation. Alternatively, high ammonia latex may be used which is produced by adding ammonia to raw rubber latex through a common method so as to inhibit the corruption of raw rubber latex due to bacteria existing in the latex and to prevent coagulation of the latex.

Examples of the alkali used in the saponification include sodium hydroxide, potassium hydroxide, calcium hydroxide, and amine compounds. Among these, sodium hydroxide and potassium hydroxide are particularly preferable for good saponifying action and stability of natural rubber latex.

The addition amount of the alkali is not particularly limited. The minimum addition amount of the alkali is preferably 0.1 parts by mass or more, and more preferably 0.3 parts by mass or more, per 100 parts by mass of the solids in natural rubber latex. The maximum addition amount of the alkali is preferably 12 parts by mass or less, more preferably 10 parts by mass or less, further preferably 7 parts by mass or less, and particularly preferably 5 parts by mass or less, per 100 parts by mass of the solids in natural rubber latex. An addition amount of the alkali of less than 0.1 parts by mass may cause a long-time saponification. On the other hand, an addition amount of the alkali of more than 12 parts by mass may destabilize natural rubber latex.

The surfactant to be used may be an anionic surfactant, a nonionic surfactant, or an ampholytic surfactant. Examples of the anionic surfactant include carboxylate anionic surfactants, sulfonate anionic surfactants, sulfate anionic surfactants, and phosphate anionic surfactants. Examples of the nonionic surfactant include polyoxyalkylene ether nonionic surfactants, polyoxyalkylene ester nonionic surfactants, polyhydric alcohol fatty acid ester nonionic surfactants, sugar fatty acid ester nonionic surfactants, and alkylpolyglycoside nonionic surfactants. Examples of the ampholytic surfactant include amino acid ampholytic surfactants, betaine ampholytic surfactants, and amine oxide ampholytic surfactants. Of these, anionic surfactants are preferable, and sulfonate anionic surfactants are more preferable.

The minimum addition amount of the surfactant is preferably 0.01 parts by mass or more, more preferably 0.1 parts by mass or more, further preferably 1.1 parts by mass or more, and particularly preferably 2.0 parts by mass or more, per 100 parts by mass of the solids in natural rubber latex. The maximum addition amount of the surfactant is preferably 6.0 parts by mass or less, more preferably 5.0 parts by mass or less, further preferably 3.5 parts by mass or less, and particularly preferably 3.0 parts by mass or less, per 100 parts by mass of the solids in natural rubber latex. An addition amount of the surfactant of less than 0.01 parts by mass may cause destabilization of natural rubber latex during the saponification. On the other hand, an addition amount of the surfactant of more than 6.0 parts by mass may excessively stabilize natural rubber latex, which may make it difficult for the latex to coagulate. An addition amount of 1.1 parts by mass or more can further reduce the phosphorus content, the nitrogen content, and the gel content in natural rubber.

The temperature during the saponification can be appropriately set within a range that allows the saponification with an alkali to proceed at a sufficient reaction rate, and within a range that does not cause natural rubber latex to be subjected to denaturation such as coagulation. Generally, the temperature during the saponification is preferably 20 to 70° C., and more preferably 30 to 70° C. The time period of the saponification, in the case of allowing natural rubber latex to stand statically, is preferably 3 to 48 hours, and more preferably 3 to 24 hours for sufficient saponification and improvement of productivity although it depends on the temperature during the saponification.

After the saponification, coagulation is performed and the coagulated rubber is broken up and then washed. Examples of the coagulation method include a method in which an acid such as formic acid is added to latex so as to adjust the pH of the latex. Examples of the washing method include a method in which the coagulated rubber is diluted with water for washing, and the mixture is centrifuged to extract the rubber. Before the centrifugation, dilution with water is first performed so that the amount of the rubber formed from natural rubber latex is 5 to 40% by mass, and preferably 10 to 30% by mass. Next, the diluted rubber mixture may be centrifuged for 1 to 60 minutes at 5000 to 10000 rpm, and such washing may be continuously performed until the rubber to be obtained has a desired phosphorus content. After the completion of washing, a saponification-treated natural rubber latex can be produced. Then, the saponification-treated natural rubber latex is dried to provide a modified natural rubber according to the present invention.

In the production method, the saponification, washing, and drying are preferably completed within 15 days after natural rubber latex is extracted. Further, it is more preferable to complete the saponification, washing, and drying within 10 days, and further preferably within 5 days after the latex is extracted. This is because the gel content increases if the latex is left to stand for more than 15 days without being solidified after extraction.

In the rubber composition of the present invention, the amount of the modified natural rubber in 100% by mass of the rubber component is 60% by mass or more, preferably 65% by mass or more, and more preferably 68% by mass or more. An amount of the modified natural rubber of less than 60% by mass may not sufficiently improve fuel economy. The amount of the modified natural rubber in 100% by mass of the rubber component is 95% by mass or less, and preferably 92% by mass or less. An amount of the modified natural rubber of more than 95% by mass provides a smaller proportion of BR and tends to deteriorate abrasion resistance and degradation resistance.

The rubber composition of the present invention contains BR. The BR is not particularly limited, and examples thereof include BRs with a high cis content and syndiotactic polybutadiene crystal-containing BRs. Other examples include BRs obtained by polymerization with a catalyst containing a lanthanum series rare earth compound, as disclosed for example in JP 2003-514078 T. Among these, BRs with a high cis content are preferable.

Preferable examples of the BR include a butadiene rubber modified with a modifying agent (referred to as "modified BR"). The use of the modified BR can lower the Tg (glass transition temperature) of polymer and improve the dispersibility of a filler such as carbon black. As a result, fuel economy and abrasion resistance can be improved while good degradation resistance is maintained. Preferable examples of the modified BR include a butadiene rubber modified with a compound represented by formula (1) above (referred to as "S-modified BR").

In the compound represented by formula (1) above, $R^1$, $R^2$, and $R^3$ are the same or different, and each of these represents an alkyl group, an alkoxy group, a silyloxy group, an acetal group, a carboxyl group (—COOH), a mercapto group (—SH), or a derivative thereof.

Examples of the alkyl group include $C_{1-4}$ alkyl groups such as a methyl group, an ethyl group, an n-propyl group, an isopropyl group, an n-butyl group, and a t-butyl group.

Examples of the alkoxy group include $C_{1-8}$ (preferably $C_{1-6}$, and more preferably $C_{1-4}$) alkoxy groups such as a methoxy group, an ethoxy group, an n-propoxy group, an isopropoxy group, an n-butoxy group, and a t-butoxy group. Examples of the alkoxy group also include cycloalkoxy groups (e.g. $C_{5-8}$ cycloalkoxy groups such as a cyclohexyloxy group), and aryloxy groups (e.g. $C_{6-8}$ aryloxy groups such as a phenoxy group and a benzyloxy group).

Examples of the silyloxy group include silyloxy groups with substitution by a $C_{1-20}$ aliphatic group or aromatic group (such as a trimethylsilyloxy group, a triethylsilyloxy group, a triisopropylsilyloxy group, a diethylisopropylsilyloxy group, a t-butyldimethylsilyloxy group, a t-butyldiphenylsilyloxy group, a tribenzylsilyloxy group, a triphenylsilyloxy group, and a tri-p-xylylsilyloxy group).

Examples of the acetal group include groups represented by formulae such as: —C(RR')—OR" and —O—C(RR')—OR". Examples of the groups represented by the former formula include a methoxymethyl group, an ethoxymethyl group, a propoxymethyl group, a butoxymethyl group, an isopropoxymethyl group, a t-butoxymethyl group, and a neopentyloxymethyl group. Examples of the groups represented by the latter formula include a methoxymethoxy group, an ethoxymethoxy group, a propoxymethoxy group, an i-propoxymethoxy group, an n-butoxymethoxy group, a t-butoxymethoxy group, an n-pentyloxymethoxy group, an n-hexyloxymethoxy group, a cyclopentyloxymethoxy group, and a cyclohexyloxymethoxy group.

$R^1$, $R^2$, and $R^3$ each are preferably an alkoxy group, and more preferably a methoxy group. As a result, the dispersibility of filler can be improved.

In the compound represented by formula (1) above, $R^4$ and $R^5$ are the same or different, and each of these represents a hydrogen atom, an alkyl group, or a cyclic ether group.

The alkyl group for $R^4$ and $R^5$ may be exemplified by the same alkyl groups as those mentioned above.

Examples of the cyclic ether group for $R^4$ and $R^5$ include: cyclic ether groups having one ether bond such as an oxirane group, an oxetane group, an oxolane group, an oxane group, an oxepane group, an oxocane group, an oxonane group, an oxecane group, an oxete group, and an oxole group; cyclic ether groups having two ether bonds such as a dioxolane group, a dioxane group, a dioxepane group, and a dioxecane group; and cyclic ether groups having three ether bonds such as a trioxane group. Of these, $C_{2-7}$ cyclic ether groups having one ether bond are preferable, and $C_{3-5}$ cyclic ether groups having one ether bond are more preferable. The cyclic ether group is preferably free from an unsaturated bond in a ring skeleton.

$R^4$ and $R^5$ each are preferably an alkyl group (of preferably $C_{1-3}$, and more preferably $C_{1-2}$) and more preferably an ethyl group. As a result, the dispersibility of filler can be improved.

The n (integer) is preferably 2 to 5. The n in this range can improve the dispersibility of filler. The n is more preferably 2 to 4, and most preferably 3. If the n is 1 or less, the modification reaction may be inhibited. If the n is 6 or more, the modifying effect may weaken.

Specific examples of the compound represented by formula (1) above include: 3-aminopropyldimethylmethoxysilane, 3-aminopropylmethyldimethoxysilane, 3-aminopropylethyldimethoxysilane, 3-aminopropyltrimethoxysilane, 3-aminopropyldimethylethoxysilane, 3-aminopropylmethyldiethoxysilane, 3-aminopropyltriethoxysilane, 3-aminopropyldimethylbutoxysilane, 3-aminopropylmethyldibutoxysilane, dimethylaminomethyltrimethoxysilane, 2-dimethylaminoethyltrimethoxysilane, 3-dimethylaminopropyltrimethoxysilane, 4-dimethylaminobutyltrimethoxysilane, dimethylaminomethyldimethoxymethylsilane, 2-dimethylaminoethyldimethoxymethylsilane, 3-dimethylaminopropyldimethoxymethylsilane, 4-dimethylaminobutyldimethoxymethylsilane, dimethylaminomethyltriethoxysilane, 2-dimethylaminoethyltriethoxysilane, 3-dimethylaminopropyltriethoxysilane, 4-dimethylaminobutyltriethoxysilane, dimethylaminomethyldiethoxymethylsilane, 2-dimethylaminoethyldiethoxymethylsilane, 3-dimethylaminopropyldiethoxymethylsilane, 4-dimethylaminobutyldiethoxymethylsilane, diethylaminomethyltrimethoxysilane, 2-diethylaminoethyltrimethoxysilane, 3-diethylaminopropyltrimethoxysilane, 4-diethylaminobutyltrimethoxysilane, diethylaminomethyldimethoxymethylsilane, 2-diethylaminoethyldimethoxymethylsilane, 3-diethylaminopropyldimethoxymethylsilane, 4-diethylaminobutyldimethoxymethylsilane, diethylaminomethyltriethoxysilane, 2-diethylaminoethyltriethoxysilane, 3-diethylaminopropyltriethoxysilane, 4-diethylaminobutyltriethoxysilane, diethylaminomethyldiethoxymethylsilane, 2-diethylaminoethyldiethoxymethylsilane, 3-diethylaminopropyldiethoxymethylsilane, 4-diethylaminobutyldiethoxymethylsilane, and compounds represented by formulae (4) to (11) below. Each of these may be used singly, or two or more of these may be used in combination. Of these, 3-diethylaminopropyltrimethoxysilane, 3-dimethylaminopropyltrimethoxysilane, and a compound represented by formula (4) below are preferable because of better dispersibility of filler.

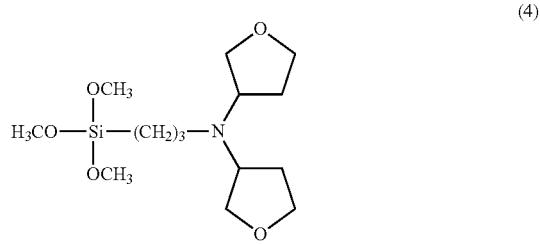

(4)

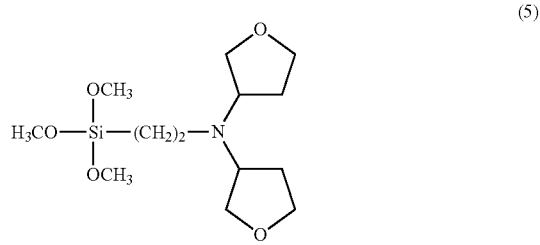

(5)

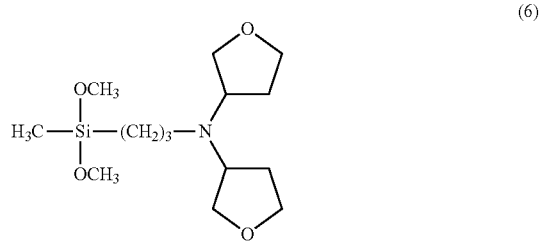

(6)

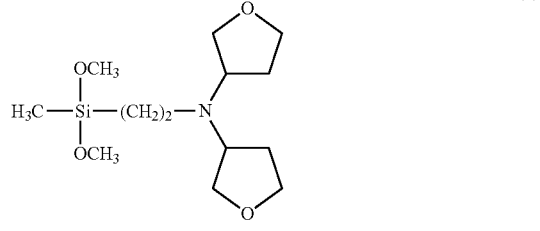

(7)

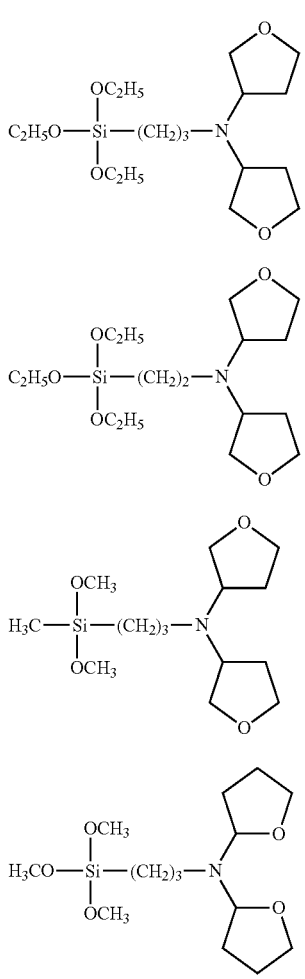

With respect to the method for modifying butadiene rubber by the compound (modifying agent) represented by formula (1) above, conventionally known methods such as methods disclosed for example in JP H6-53768 B, JP H6-57767 B, and JP 2003-514078 T may be used. What is required for the modification is to allow butadiene rubber to contact with a modifying agent; for example, a method in which butadiene rubber is formed by polymerization and a modifying agent in a predetermined amount is then added to the polymerized rubber solution, and a method in which a modifying agent is added to a butadiene rubber solution so that they react with each other can be employed.

The BR to be modified may be exemplified by the same BRs as those mentioned above.

Suitable examples of the BR include a butadiene rubber synthesized with a rare earth catalyst (referred to as "rare earth BR"). When a rare earth BR having a high cis content and a low vinyl content is used with HPNR, good abrasion resistance can be secured so that the effects of the present invention can be favorably achieved. As the rare earth catalyst, publicly known ones may be used. Examples thereof include catalysts containing lanthanum series rare earth compounds, organoaluminum compounds, aluminoxanes, or halogen-containing compounds, optionally with a Lewis base. Of these, Nd catalysts, which contain neodymium (Nd)-containing compounds as the lanthanum series rare earth compounds, are particularly preferable.

Examples of the lanthanum series rare earth compounds include halides, carboxylates, alcoholates, thioalcoholates, and amides of rare earth metals having atomic numbers 57-71. As described above, Nd catalysts are preferable because BRs having a high cis content and a low vinyl content can be obtained.

As the organoaluminium compounds, compounds represented by $AlR^aR^bR^c$ (wherein $R^a$, $R^b$, and $R^c$ are the same or different, and each of these represents hydrogen or a $C_{1-8}$ hydrocarbon group) may be used. Examples of the aluminoxanes include chain aluminoxanes and cyclic aluminoxanes. Examples of the halogen-containing compounds include: aluminum halides represented by $AlX_kR^d_{3-k}$ (wherein X represents halogen, $R^d$ represents a $C_{1-20}$ alkyl, aryl, or aralkyl group, and k represents 1, 1.5, 2, or 3); strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. The Lewis base may be used for complexing a lanthanum series rare earth compound, and suitable examples thereof include acetylacetone, ketones, and alcohols.

In the polymerization of butadiene, the rare earth catalyst may be used as a solution in an organic solvent (such as n-hexane, cyclohexane, n-heptane, toluene, xylene, or benzene), or carried on an appropriate carrier such as silica, magnesia, or magnesium chloride. As the polymerization conditions, either the solution polymerization or bulk polymerization can be employed. The polymerization temperature is preferably in the range of −30 to 150° C., and the polymerization pressure may be appropriately set depending on other conditions.

The rare earth BR has a Mooney viscosity $ML_{1+4}$ (100° C.) of preferably 35 or more, more preferably 40 or more, and further preferably 44 or more. A Mooney viscosity of less than 35 may cause the unvulcanized rubber composition to have a low viscosity and may not secure a proper thickness after vulcanization. The rare earth BR has a Mooney viscosity of preferably 55 or less, and more preferably 50 or less. If the Mooney viscosity exceeds 55, the unvulcanized rubber composition may become so hard that it is difficult to extrude it so as to provide smooth edges.

The Mooney viscosity is determined in conformity with ISO289 and JIS K6300.

The ratio (Mw/Mn) of the weight-average molecular weight (Mw) to the number-average molecular weight (Mn) of the rare earth BR is preferably 1.2 or higher, more preferably 1.5 or higher, and further preferably 2.5 or higher. If the Mw/Mn is less than 1.2, processability tends to be remarkably deteriorated. The Mw/Mn is preferably 5 or lower, more preferably 4 or lower, and further preferably 3 or lower. If the Mw/Mn exceeds 5, abrasion resistance is less likely to be improved.

The Mw of the rare earth BR is preferably 300,000 or more, more preferably 500,000 or more, and further preferably 550,000 or more. The Mw is preferably 1,500,000 or less, and more preferably 1,200,000 or less. The Mn of the rare earth BR is preferably 100,000 or more, and more preferably 150,000 or more. The Mn is preferably 1,000,000 or less, and more preferably 800,000 or less. If the Mw or Mn is less than its minimum value, abrasion resistance and fuel economy tend to be deteriorated. If the Mw or Mn exceeds its maximum value, processability may be deteriorated.

In the present invention, the Mw and the Mn are determined relative to polystyrene standards by gel permeation chromatography (GPC).

The cis content of the rare earth BR is preferably 95% by mass or more, more preferably 96% by mass or more, and further preferably 97% by mass or more. If it is less than 95% by mass, abrasion resistance is less likely to be improved. The upper limit of the cis content of the rare earth BR is not particularly limited, and may be 100% by mass.

The vinyl content of the rare earth BR is preferably 1.0% by mass or less, more preferably 0.8% by mass or less, further preferably 0.6% by mass or less, and particularly preferably 0.5% by mass or less. If the vinyl content exceeds 1.0% by mass, abrasion resistance is less likely to be improved. The lower limit of the vinyl content of the rare earth BR is not particularly limited, and may be 0% by mass.

In the present invention, the vinyl content (1,2-bond butadiene unit content) and the cis content (cis-1,4-bond butadiene unit content) of the rare earth BR can be determined by infrared absorption spectrum analysis.

The amount of BR (including modified BR and rare earth BR) in 100% by mass of the rubber component is 5% by mass or more, and preferably 8% by mass or more. If the amount is less than 5% by mass, abrasion resistance may not be sufficiently improved. The amount of BR in 100% by mass of the rubber component is 40% by mass or less, preferably 35% by mass or less, and more preferably 32% by mass or less. If the amount exceeds 40% by mass, the relative proportion of HPNR is decreased, and fuel economy tends to be deteriorated.

The total amount of the HPNR and BR in 100% by mass of the rubber component is preferably 70% by mass or more, more preferably 80% by mass or more, further preferably 90% by mass or more, and particularly preferably 100% by mass. If the total amount is less than 70% by mass, the respective performances may not be achieved in good balance.

Examples of rubbers that may be additionally used in the present invention include diene rubbers such as natural rubber (NR), isoprene rubber (IR), styrene butadiene rubber (SBR), acrylonitrile butadiene rubber (NBR), chloroprene rubber (CR), and butyl rubber (IIR).

The rubber composition of the present invention preferably contains silica. Containing silica makes it possible to improve reinforcement and fuel economy so that the effects of the present invention can be favorably achieved. Examples of the silica include dry silica (silicic anhydride) and wet silica (hydrous silicic acid). The wet silica is preferable because it has more silanol groups.

The average primary particle size of the silica is preferably 10 nm or more, and more preferably 15 nm or more. If the average primary particle size is less than 10 nm, the silica is less likely to be dispersed, and fuel economy and processability tend to be deteriorated. The average primary particle size of the silica is preferably 40 nm or less, and more preferably 30 nm or less. If the average primary particle size is more than 40 nm, rubber strength tends to be poor, and abrasion resistance tends to be deteriorated.

The average primary particle size of the silica can be determined, for example, by observing the silica with an electron microscope, measuring particle sizes of any 50 particles thereof, and averaging the particle sizes.

The nitrogen adsorption specific surface area ($N_2SA$) of the silica is preferably 120 $m^2/g$ or more, more preferably 140 $m^2/g$ or more, and further preferably 150 $m^2/g$ or more. If the $N_2SA$ is less than 120 $m^2/g$, sufficient reinforcement tends not to be obtained. The $N_2SA$ of the silica is preferably 250 $m^2/g$ or less, and more preferably 200 $m^2/g$ or less. If the $N_2SA$ is more than 250 $m^2/g$, the viscosity of the unvulcanized rubber composition tends to increase, and processability tends to be deteriorated.

The $N_2SA$ of the silica is determined by the BET method in accordance with ASTM D3037-81.

The amount of the silica is 10 parts by mass or more, and preferably 12 parts by mass or more, per 100 parts by mass of the rubber component. If the amount of the silica is less than 10 parts by mass, effects caused by silica tend to be insufficient. The amount of the silica is 60 parts by mass or less, preferably 45 parts by mass or less, and more preferably 35 parts by mass or less, per 100 parts by mass of the rubber component. If the amount of the silica is more than 60 parts by mass, the viscosity of the unvulcanized rubber composition tends to increase, and processability tends to be deteriorated.

The rubber composition of the present invention may contain a silane coupling agent that is a copolymer comprising units A represented by the above-mentioned formula (2) and units B represented by the above-mentioned formula (3), in which the proportion of the units B is 1 to 70 mol % of the total molar amount of the units A and the units B. When the rubber composition contains the silane coupling agent having the above structure, together with HPNR and BR (preferably rare earth BR), good silica dispersibility can be achieved. Accordingly, fuel economy and abrasion resistance can be improved while good processability is secured.

In the silane coupling agent having the above structure, the molar ratio of the unit A and the unit B satisfies the aforementioned condition. Thus, such a silane coupling agent suppresses an increase in viscosity upon processing in comparison with polysulfide silanes such as bis-(3-triethoxysilylpropyl)tetrasulfide. This is presumably for the following reason. Since the sulfide portion of the unit A is a C—S—C bond, the sulfide portion is thermally stable compared with tetrasulfide or disulfide. Accordingly, an increase in Mooney viscosity is small.

In the case where the molar ratio of the unit A and the unit B satisfies the condition, the silane coupling agent suppresses a reduction in scorch time in comparison with mercaptosilanes such as 3-mercaptopropyltrimethoxysilane. This is presumably for the following reason. The unit B has a mercaptosilane structure, and the —SH group of the unit B is covered with the —$C_7H_{15}$ portion of the unit A. Accordingly, the —SH group is less likely to react with polymers. Thereby, scorch time is less likely to be reduced, and viscosity is less likely to increase.

Examples of the halogen for $R^6$ include chlorine, bromine, and fluorine.

Examples of the branched or unbranched $C_{1-30}$ alkyl group for $R^6$ and $R^7$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, and a decyl group. The number of carbons of the alkyl group is preferably 1 to 12.

Examples of the branched or unbranched $C_{1-30}$ alkylene group for $R^6$ and $R^7$ include an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group. The number of carbons of the alkylene group is preferably 1 to 12.

Examples of the branched or unbranched $C_{2-30}$ alkenyl group for $R^6$ and $R^7$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. The number of carbons of the alkenyl group is preferably 2 to 12.

Examples of the branched or unbranched $C_{2-30}$ alkenylene group for $R^6$ and $R^7$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The number of carbons of the alkenylene group is preferably 2 to 12.

Examples of the branched or unbranched $C_{2-30}$ alkynyl group for $R^6$ and $R^7$ include an ethynyl group, a propynyl group, a butynyl group, a pentynyl group, a hexynyl group, a heptynyl group, an octynyl group, a nonynyl group, a decynyl group, an undecynyl group, and a dodecynyl group. The number of carbons of the alkynyl group is preferably 2 to 12.

Examples of the branched or unbranched $C_{2-30}$ alkynylene group for $R^6$ and $R^7$ include an ethynylene group, a propynylene group, a butynylene group, a pentynylene group, a hexynylene group, a heptynylene group, an octynylene group, a nonynylene group, a decynylene group, an undecynylene group, and a dodecynylene group. The number of carbons of the alkynylene group is preferably 2 to 12.

In the silane coupling agent having the above structure, the total number of repetition (x+y) of the number of repetition (x) of the unit A and the number of repetition (y) of the unit B is preferably 3 to 300. If the total number is within such a range, the —$C_7H_{15}$ portion of the unit A covers the mercaptosilane of the unit B. Accordingly, the reduction in scorch time can be suppressed, and simultaneously, good reactivity with silica and a rubber component can be secured.

Examples of the silane coupling agent having the above structure include NXT-Z30, NXT-Z45, and NXT-Z60 (all produced by Momentive Performance Materials). These may be used alone, or two or more kinds thereof may be used in combination.

The amount of the silane coupling agent having the above structure is preferably 2 parts by mass or more, more preferably 4 parts by mass or more, and further preferably 6 parts by mass or more, per 100 parts by mass of the silica. If the amount is less than 2 parts by mass, rolling resistance tends to increase, and fuel economy thus tends to be deteriorated. The amount is preferably 20 parts by mass or less, more preferably 16 parts by mass or less, further preferably 12 parts by mass or less, and particularly preferably 10 parts by mass or less, per 100 parts by mass of the silica. If the amount exceeds 20 parts by mass, the obtained effects tend not to be worth the cost increase.

The rubber composition may optionally contain compounding ingredients generally used in the rubber industry, in addition to the aforementioned ingredients. Examples of the compounding ingredients include fillers such as carbon black, oils or plasticizers, antioxidants, age resistors, zinc oxide, vulcanizing agents such as sulfur and sulfur-containing compounds, and vulcanization accelerators.

The rubber composition of the present invention preferably contains carbon black. Examples of the usable carbon black include, but not particularly limited to, GPF, FEF, HAF, ISAF, and SAF. If the rubber composition contains carbon black, reinforcement can be improved. Accordingly, its use in combination with HPNR and BR favorably achieves the effects of the present invention.

The nitrogen adsorption specific surface area ($N_2SA$) of the carbon black is preferably 20 $m^2/g$ or more, more preferably 35 $m^2/g$ or more, further preferably 70 $m^2/g$ or more, and particularly preferably 100 $m^2/g$ or more. If the $N_2SA$ is less than 20 $m^2/g$, sufficient reinforcement may not be achieved.

The $N_2SA$ of the carbon black is preferably 200 $m^2/g$ or less, and more preferably 150 $m^2/g$ or less. If the $N_2SA$ is more than 200 $m^2/g$, the carbon black is less likely to be favorably dispersed.

The nitrogen adsorption specific surface area of the carbon black is determined in accordance with the A method of JIS K6217.

In the case where the rubber composition contains carbon black, the amount of the carbon black is preferably 5 parts by mass or more, more preferably 10 parts by mass or more, further preferably 15 parts by mass or more, particularly preferably 20 parts by mass or more, and most preferably 30 parts by mass or more, per 100 parts by mass of the rubber component. If the amount is less than 5 parts by mass, reinforcement may not be sufficiently improved. The amount of the carbon black is preferably 100 parts by mass or less, more preferably 80 parts by mass or less, further preferably 60 parts by mass or less, particularly preferably 45 parts by mass or less, and most preferably 40 parts by mass or less, per 100 parts by mass of the rubber component. If the amount exceeds 100 parts by mass, the carbon black is less likely to be favorably dispersed. In addition, processability tends to be deteriorated.

The total amount of carbon black and silica in the rubber composition of the present invention is preferably 15 parts by mass or more, more preferably 30 parts by mass or more, and further preferably 45 parts by mass or more, per 100 parts by mass of the rubber component. The total amount is preferably 100 parts by mass or less, more preferably 80 parts by mass or less, further preferably 65 pasts by mass or less, and particularly preferably 55 parts by mass or less, per 100 parts by mass of the rubber component. If the total amount is within such a range, good abrasion resistance can be achieved. In the rubber composition of the present invention, since HPNR and BR in predetermined amounts are used in combination, good fuel economy can be achieved without lessening the total amount of carbon black and silica.

In the rubber composition of the present invention, the amount of oil is preferably 5 parts by mass or less, more preferably 1 part by mass or less, and further preferably 0 parts by mass (substantially no oil), per 100 parts by mass of the rubber component. In the rubber composition of the present invention, the Mooney viscosity is decreased with the use of HPNR compared with the use of NR. Accordingly, while good processability is maintained, the amount of oil can be reduced so that fuel economy can be further improved.

The rubber composition of the present invention is produced by a common method. More specifically, the rubber composition is produced, for example, by a method including mixing the aforementioned ingredients with a mixing apparatus such as a Banbury mixer, a kneader, or an open roll mill, and then vulcanizing the resultant mixture. The rubber composition of the present invention is suitably used for a tread (cap tread) of a heavy-load tire (in particular, for trucks and buses).

The heavy-load tire of the present invention is produced with the above rubber composition by a common method. More specifically, an unvulcanized rubber composition containing the aforementioned ingredients is extruded and processed into the shape of a tire component such as a tread, and then molded with other tire components in a common manner on a tire building machine to form an unvulcanized tire. Then, the unvulcanized tire is heated and pressurized in a vulcanizer to produce a heavy-load tire according to the present invention.

EXAMPLES

The following will describe the present invention specifically with reference to Examples, but the present invention is not limited thereto.

The respective chemical agents used in Examples 1 to 4 and Comparative Examples 1 to 3 are listed below.

Natural rubber latex: Field latex obtained from Thaitex
Surfactant: Emal-E produced by Kao Corporation
NaOH: NaOH produced by Wako Pure Chemical Industries, Ltd.
NR: TSR
HPNR (saponified natural rubber): Preparation 1 mentioned below
Non-modified BR: BR150B produced by Ube Industries, Ltd.
Modified BR: Modified butadiene rubber produced by Sumitomo Chemical Co., Ltd. (S-modified BR (terminal-modified), vinyl content: 15% by mass, $R^1$, $R^2$, $R^3$=—$OCH_3$; $R^4$, $R^5$=—$CH_2CH_3$; n=3)
Carbon black: SHOBLACK N220 produced by CABOT JAPAN K.K. ($N_2SA$: 111 $m^2/g$)
Wax: Sunnoc Wax produced by Ouchi Shinko Chemical Industrial Co., Ltd.
Age resistor: Age resistor 6C (SANTOFLEX 6PPD) produced by FLEXSYS
Stearic acid: Stearic acid "TSUBAKI" produced by NOF Corporation
Zinc oxide: Zinc oxide #2 produced by Mitsui Mining & Smelting Co., Ltd.
Sulfur: Sulfur powder produced by Tsurumi Chemical industry Co., Ltd.
Vulcanization accelerator: Nocceler NS produced by Ouchi Shinko Chemical Industrial Co., Ltd.
(Production of Natural Rubber Saponified with Alkali)

Preparation 1

The solids content (DRC) of natural rubber latex was adjusted to 30% (w/v). Next, 1000 g of the natural rubber latex was mixed with 10 g of Emal-E and 20 g of NaOH, and then saponified for 48 hours at room temperature. Thereby, a saponified natural rubber latex was produced. The saponified latex was diluted with water to a DRC of 15% (w/v). The diluted latex was mixed with formic acid, while being slowly stirred, so that the pH was adjusted to 4.0 to 4.5. The latex was coagulated, and the coagulated rubber was broken up and repeatedly washed with 1000 ml of water. Then, the rubber was dried for two hours at 110° C., and thereby a solid rubber (saponified natural rubber) was obtained.

TSR and the solid rubber produced in Preparation 1 were determined for nitrogen content, phosphorus content, and gel content by the following methods. Table 1 shows the results.
(Determination of Nitrogen Content)

The nitrogen content was determined with CHN CORDER MT-5 (produced by Yanaco Analytical Instruments Corp.). In the determination, first, a calibration curve for determining the nitrogen content was prepared with antipyrin taken as a reference material. Then, an about 10 mg sample of TSR or the modified natural rubber produced in the Preparation was weighed out and subjected to the determination. From three determination results, the average value was calculated and taken as the nitrogen content of the sample.
(Determination of Phosphorus Content)

The phosphorus content was determined with an ICP emission spectrometer (ICPS-8100, produced by Shimadzu Corporation).

$^{31}$P-NMR measurement of phosphorus was also performed as follows. Components extracted from the raw rubbers with chloroform were purified and then dissolved in $CDCl_3$ to prepare test samples. The test samples were analyzed with an NMR spectrometer (400 MHz, AV400M, produced by Bruker Japan Co., Ltd.) based on the standard (0 ppm) that was the determined peak corresponding to the P atom of an 80% phosphoric acid aqueous solution.
(Determination of Gel Content)

70.00 mg of each raw rubber sample cut in a size of 1 mm×1 mm was weighed, mixed with 35 mL of toluene, and allowed to stand for one week in a cool and dark place. Next, the mixture was centrifuged so that a toluene-insoluble gel fraction was precipitated, and a toluene-soluble supernatant was removed. Then, the gel fraction alone was solidified with methanol and dried. The mass of the dried gel fraction was measured, and then used in the following formula to determine the gel content (%).

Gel content (% by mass)=[mass of dried gel fraction (mg)/mass of original sample (mg)]×100

TABLE 1

| | Saponified natural rubber (Preparation 1) | TSR |
|---|---|---|
| Nitrogen content (% by mass) | 0.12 | 0.33 |
| Phosphorus content (ppm) | 84 | 572 |
| Gel content (% by mass) | 5.5 | 26.9 |

As shown in Table 1, the saponified natural rubber (HPNR) was found to have a decreased nitrogen content, phosphorus content and gel content compared with TSR. Further, the modified natural rubber produced in Preparation 1 showed no peak corresponding to phospholipids between −3 ppm and 1 ppm in a $^{31}$P-NMR spectrum of an extract thereof.

Examples 1 to 4 and Comparative Examples 1 to 3

In accordance with each formulation shown in Table 2, the chemical agents other than the sulfur and the vulcanization accelerator were mixed by a 1.7-L Banbury mixer to give a mixture. Next, the sulfur and the vulcanization accelerator were added to the resultant mixture, and they were mixed with an open roll mill. Thereby, an unvulcanized rubber composition was produced. The unvulcanized rubber composition thus produced was pressed with a 2-mm-thick mold for 30 minutes at 150° C. Thereby, a vulcanized rubber composition was produced.

The produced vulcanized rubber composition was tested in the following ways.
(Heat Build-Up Index)

The tan δ of each vulcanized rubber composition was determined with a viscoelasticity spectrometer VES (produced by Iwamoto Seisakusho Co., Ltd.) under the following conditions: a temperature of 70° C.; an initial strain of 10%; and a dynamic strain of 2%. The tans of each formulation was expressed as an index value relative to a value of 100 representing the tan δ of Comparative Example 1 by the following equation. A smaller index means less heat build-up, that is, better fuel economy.

(Heat build-up index)=(Tan δ of each formulation)/ (Tan δ of Comparative Example 1)×100

(Abrasion Resistance Index)

The Lambourn abrasion loss of each vulcanized rubber composition was measured with a Lambourn abrasion tester (produced by Iwamoto Seisakusho Co., Ltd.) under conditions of: a surface rotational speed of 50 m/min; an applied load of 3.0 kg; a dropping rate of a dusting powder of 15 g/min; and a slip ratio of 20%. Then, a volume loss was calculated from the measured Lambourn abrasion loss. The volume loss of each formulation was expressed as an index value relative to a value of 100 representing the volume loss of Comparative Example 1 by the following formula. A larger index means better abrasion resistance.

(Abrasion resistance index)=(Volume loss of Comparative Example 1)/(Volume loss of each formulation)×100

(Degradation Resistance)

Each vulcanized rubber composition was thermally degraded for seven days in an 80° C. oven to give a degraded sample. The degraded sample was then subjected to a tensile test in accordance with JIS K6251, so that the elongation at break of the sample was determined. The elongation at break of each formulation was expressed as an index value relative to a value of 100 representing the elongation at break of Comparative Example 1 by the following formula. A larger index means better degradation resistance.

(Degradation resistance index)=(Elongation at break of each formulation)/(Elongation at break of Comparative Example 1)×100

Nd BR: Buna CB24 produced by LANXESS (BR synthesized with Nd catalyst, cis content: 97.6% by mass, vinyl content: 0.4% by mass, $M_{1+4}$ (100° C.): 45, Mw: $59.7 \times 10^4$, Mn: $22.2 \times 10^4$, Mw/Mn: 2.7)

Carbon black: SHOBLACK N220 produced by Cabot Japan K.K. ($N_2$SA: 111 $m^2/g$)

Silica: ULTRASIL VN3 produced by Degussa AG (average primary particle size: 15 nm, $N_2$SA: 175 $m^2/g$)

Silane coupling agent 1: Si266 produced by Degussa AG (sulfide silane)

Silane coupling agent 2: A1891 produced by Momentive Performance Materials (mercaptosilane)

Silane coupling agent 3: NXT-Z45 produced by Momentive Performance Materials (copolymer of unit A and unit B (unit A: 55 mol %, unit B: 45 mol %))

Silane coupling agent 4: NXT-Z15 produced by Momentive Performance Materials (copolymer of unit A and unit B (unit A: 85 mol %, unit B: 15 mol %))

Silane coupling agent 5: NXT-Z60 produced by Momentive Performance Materials (copolymer of unit A and unit B (unit A: 40 mol %, unit B: 60 mol %))

Wax: Sunnoc Wax produced by Ouchi Shinko Chemical Industrial Co., Ltd.

TABLE 2

|  |  | Comparative Example 1 | Comparative Example 2 | Example 1 | Example 2 | Example 3 | Comparative Example 3 | Example 4 |
|---|---|---|---|---|---|---|---|---|
| Formulation (part(s) by mass) | NR | 100 | — | — | — | — | — | — |
|  | HPNR | — | 100 | 95 | 90 | 70 | 50 | 70 |
|  | Non-modified BR | — | — | 5 | 10 | 30 | 50 | — |
|  | Modified BR | — | — | — | — | — | — | 30 |
|  | Carbon black | 45 | 45 | 45 | 45 | 45 | 45 | 45 |
|  | Wax | 1.5 | 1.5 | 1.5 | 1.5 | 1.5 | 1.5 | 1.5 |
|  | Age resistor | 2 | 2 | 2 | 2 | 2 | 2 | 2 |
|  | Stearic acid | 2 | 2 | 2 | 2 | 2 | 2 | 2 |
|  | Zinc oxide | 3 | 3 | 3 | 3 | 3 | 3 | 3 |
|  | Sulfur | 1 | 1 | 1 | 1 | 1 | 1 | 1 |
|  | Vulcanization accelerator | 1.5 | 1.5 | 1.5 | 1.5 | 1.5 | 1.5 | 1.5 |
| Evaluation | Heat build-up index | 100 | 92 | 93 | 93 | 95 | 105 | 90 |
|  | Abrasion resistance index | 100 | 93 | 100 | 102 | 103 | 98 | 111 |
|  | Degradation resistance index | 100 | 90 | 98 | 99 | 100 | 100 | 97 |

Table 2 shows that in Examples in which HPNR and BR were used in combination, high levels of fuel economy and abrasion resistance were achieved in good balance while good degradation resistance was maintained. In particular, excellent performances were achieved in Example 4 in which modified BR was used. On the other hand, performances of Comparative Examples 1 and 2 in which HPNR and BR were not used in combination and Comparative Example 3 in which the amounts of HPNR and BR were outside the respective predetermined ranges were inferior to those of Examples.

In the following, the respective chemical agents used in Examples 5 to 13 and Comparative Examples 4 and 5 are listed.

NR: TSR

HPNR (saponified natural rubber): Preparation 1 mentioned above

Co BR1: BR150B produced by Ube Industries, Ltd. (BR synthesized with Co catalyst, cis content: 97.0% by mass, vinyl content: 1.5% by mass, $ML_{1+4}$ (100° C.): 40, Mw: $52.0 \times 10^4$, Mn: $15.0 \times 10^4$, Mw/Mn: 3.3)

Co BR2: BR150L produced by Ube Industries, Ltd. (BR synthesized with Co catalyst, cis content: 98.2% by mass, vinyl content: 1.0% by mass, $ML_{1+4}$ (100° C.): 43, Mw: $54.2 \times 10^4$, Mn: $22.1 \times 10^4$, Mw/Mn: 2.4)

Age resistor: Age resistor 6C (SANTOFLEX 6PPD) produced by FLEXSYS

Stearic acid: Stearic acid "TSUBAKI" produced by NOF Corporation

Zinc oxide: Zinc oxide #2 produced by Mitsui Mining & Smelting Co., Ltd.

Sulfur: Sulfur powder produced by Tsurumi Chemical industry Co., Ltd.

Vulcanization accelerator: Nocceler NS produced by Ouchi Shinko Chemical Industrial Co., Ltd.

Examples 5 to 13 and Comparative Examples 4 and 5

In accordance with each formulation shown in Tables 3 and 4, the chemical agents other than the sulfur and the vulcanization accelerator were mixed by a 1.7-L Banbury mixer to give a mixture. Next, the sulfur and the vulcanization accelerator were added to the resultant mixture, and they were mixed with an open roll mill. Thereby, an unvulcanized rubber composition was produced. The unvulcanized rubber composition thus produced was pressed with a 2-mm-thick mold for 30 minutes at 150° C. Thereby, a vulcanized rubber composition was produced.

The produced unvulcanized rubber composition and vulcanized rubber composition were tested in the following ways.

(Heat Build-Up Index)

The tan δ of each vulcanized rubber composition was determined with a viscoelasticity spectrometer VES (produced by Iwamoto Seisakusho Co., Ltd.) under the following conditions: a temperature of 70° C.; an initial strain of 10%; and a dynamic strain of 2%. The tan δ of each formulation was expressed as an index value relative to a value of 100 representing the tan δ of Comparative Example 5 by the following equation. A smaller index means less heat build-up, that is, better fuel economy.

(Heat build-up index)=(Tan δ of each formulation)/
(Tan δ of Comparative Example 5)×100

(Abrasion Resistance Index)

The Lambourn abrasion loss of each vulcanized rubber composition was measured with a Lambourn abrasion tester (produced by Iwamoto Seisakusho Co., Ltd.) under conditions of: a surface rotational speed of 50 m/min; an applied load of 3.0 kg; a dropping rate of a dusting powder of 15 g/min; and a slip ratio of 20%. Then, a volume loss was calculated from the measured Lambourn abrasion loss. The volume loss of each formulation was expressed as an index value relative to a value of 100 representing the volume loss of Comparative Example 5 by the following formula. A larger index means better abrasion resistance.

(Abrasion resistance index)=(Volume loss of Comparative Example 5)/(Volume loss of each formulation)×100

(Mooney Viscosity Index)

The Mooney viscosity of each unvulcanized rubber composition was determined at 100° C. in accordance with JIS K6300. The Mooney viscosity of each formulation was expressed as an index value relative to a value of 100 representing the Mooney viscosity of Comparative Example 5 by the following equation. A larger index means lower Mooney viscosity, that is, better processability.

(Mooney viscosity index)=(Mooney viscosity of
Comparative Example 5)/(Mooney viscosity of
each formulation)×100

(Scorch Time Index)

The time ($T_{10}$) required for each unvulcanized rubber composition to reach a vulcanization degree of 10% was measured at 160° C. in accordance with JIS K6300. Based on the following equation, the measurement result of each formulation was expressed as an index value relative to a value of 100 representing the $T_{10}$ of Comparative Example 5. A larger index means longer scorch time, that is, better processability.

(Scorch time index)=($T_{10}$ of each formulation)/($T_{10}$ of
Comparative Example 5)×100

TABLE 3

|  |  | Examples | | | | | | | | |
| --- | --- | --- | --- | --- | --- | --- | --- | --- | --- | --- |
|  |  | 5 | 6 | 7 | 8 | 9 | 10 | 11 | 12 | 13 |
| Formulation (part(s) by mass) | NR | — | — | — | — | — | — | — | — | — |
|  | HPNR | 80 | 80 | 90 | 90 | 70 | 70 | 80 | 80 | 80 |
|  | Co BR1 | — | — | — | — | — | — | — | — | — |
|  | Co BR2 | — | — | — | — | — | — | — | — | — |
|  | Nd BR | 20 | 20 | 10 | 10 | 30 | 30 | 20 | 20 | 20 |
|  | Carbon black | 35 | 35 | 35 | 35 | 35 | 35 | 20 | 35 | 35 |
|  | Silica | 15 | 15 | 15 | 15 | 15 | 15 | 30 | 15 | 15 |
|  | Silane coupling agent 1 | — | — | — | — | — | — | — | — | — |
|  | Silane coupling agent 2 | — | — | — | — | — | — | — | — | — |
|  | Silane coupling agent 3 | 0.3 | 1.2 | 0.3 | 1.2 | 0.3 | 1.2 | 1.2 | — | — |
|  | Silane coupling agent 4 | — | — | — | — | — | — | — | 1.2 | — |
|  | Silane coupling agent 5 | — | — | — | — | — | — | — | — | 1.2 |
|  | Wax | 1.5 | 1.5 | 1.5 | 1.5 | 1.5 | 1.5 | 1.5 | 1.5 | 1.5 |
|  | Age resistor | 2 | 2 | 2 | 2 | 2 | 2 | 2 | 2 | 2 |
|  | Stearic acid | 2 | 2 | 2 | 2 | 2 | 2 | 2 | 2 | 2 |
|  | Zinc oxide | 3 | 3 | 3 | 3 | 3 | 3 | 3 | 3 | 3 |
|  | Sulfur | 1 | 1 | 1 | 1 | 1 | 1 | 1 | 1 | 1 |
|  | Vulcanization accelerator | 1.5 | 1.5 | 1.5 | 1.5 | 1.5 | 1.5 | 1.5 | 1.5 | 1.5 |
| Evaluation | Heat build-up index | 83 | 80 | 80 | 81 | 86 | 83 | 76 | 86 | 83 |
|  | Abrasion resistance index | 98 | 102 | 103 | 103 | 101 | 103 | 95 | 100 | 101 |
|  | Mooney viscosity index | 107 | 110 | 106 | 108 | 107 | 111 | 104 | 111 | 110 |
|  | Scorch time index | 94 | 97 | 94 | 95 | 97 | 99 | 98 | 97 | 94 |

TABLE 4

|  |  | Comparative Examples | |
| --- | --- | --- | --- |
|  |  | 4 | 5 |
| Formulation (part(s) by mass) | NR | 80 | 80 |
|  | HPNR | — | — |
|  | Co BR1 | 20 | 20 |
|  | Co BR2 | — | — |
|  | Nd BR | — | — |
|  | Carbon black | 45 | 35 |
|  | Silica | — | 15 |
|  | Silane coupling agent 1 | — | 1.2 |
|  | Silane coupling agent 2 | — | — |
|  | Silane coupling agent 3 | — | — |
|  | Silane coupling agent 4 | — | — |
|  | Silane coupling agent 5 | — | — |
|  | Wax | 1.5 | 1.5 |
|  | Age resistor | 2 | 2 |
|  | Stearic acid | 2 | 2 |
|  | Zinc oxide | 3 | 3 |
|  | Sulfur | 1 | 1 |
|  | Vulcanization accelerator | 1.5 | 1.5 |
| Evaluation | Heat build-up index | 111 | 100 |
|  | Abrasion resistance index | 111 | 100 |
|  | Mooney viscosity index | 112 | 100 |
|  | Scorch time index | 104 | 100 |

Tables 3 and 4 show that in Examples in which HPNR, Nd BR, and silica were used in combination and any one of silane coupling agents 3 to 5 was used, well-balanced improvement in fuel economy and abrasion resistance was achieved at high levels. In addition, processability was good, and these performances were achieved in good balance. On the other hand, performances of Comparative Examples in which the aforementioned ingredients were not used in combination were inferior to those of Examples.

The invention claimed is:
1. A rubber composition for a tire, comprising
a rubber component that contains a modified natural rubber having a phosphorus content of 200 ppm or less and a butadiene rubber,
wherein the amount of the modified natural rubber is 60 to 95% by mass and the amount of the butadiene rubber is 5 to 40% by mass, based on 100% by mass of the rubber component.
2. The rubber composition for a tire according to claim 1, wherein the modified natural rubber has a gel content of 20% by mass or less, the gel content being determined as the amount of a toluene-insoluble matter.
3. The rubber composition for a tire according to claim 1, wherein the modified natural rubber has no phospholipid peak in a range of -3 to 1 ppm in a $^{31}$P NMR measurement of a chloroform extract thereof, so that it contains substantially no phospholipids.
4. The rubber composition for a tire according to claim 1, wherein the modified natural rubber contains 0.3% by mass or less of nitrogen.
5. The rubber composition for a tire according to claim 1, wherein the modified natural rubber is produced by saponifying natural rubber latex.
6. The rubber composition for a tire according to claim 1, wherein the butadiene rubber is a modified butadiene rubber.
7. The rubber composition for a tire according to claim 6, wherein the butadiene rubber is modified by a compound represented by formula (1):

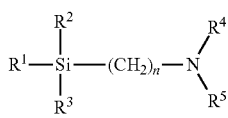

(1)

wherein $R^1$, $R^2$, and $R^3$ are the same or different, and each of these represents an alkyl group, an alkoxy group, a silyloxy group, an acetal group, a carboxyl group, a mercapto group, or a derivative thereof,
$R^4$ and $R^5$ are the same or different, and each of these represents a hydrogen atom, an alkyl group, or a cyclic ether group, and n represents an integer.
8. The rubber composition for a tire according to claim 1, wherein the butadiene rubber is synthesized with a rare earth catalyst.
9. The rubber composition for a tire according to claim 8, wherein the butadiene rubber synthesized with the rare earth catalyst has a cis content of 95% by mass or more and a vinyl content of 1.0% by mass or less.
10. The rubber composition for a tire according to claim 1, further comprising:
silica and
a silane coupling agent,
wherein the silane coupling agent is a copolymer comprising units A represented by formula (2) and units B represented by formula (3), and the proportion of the units B is 1 to 70 mol% of the total molar amount of the units A and the units B, and
the amount of the silica is 10 to 60 parts by mass per 100 parts by mass of the rubber component:

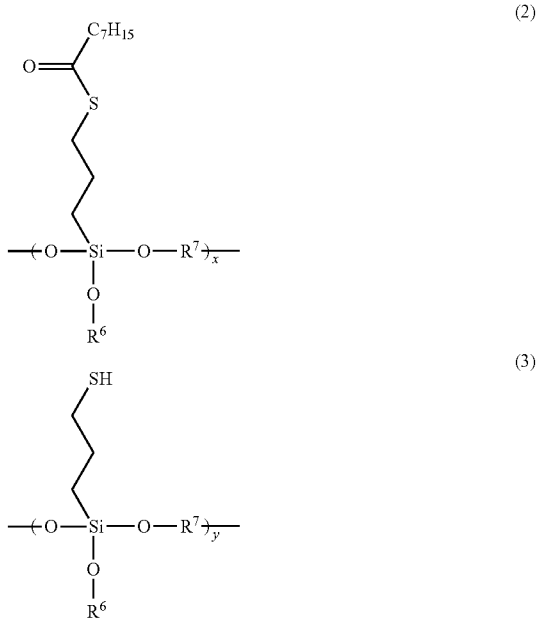

wherein x and y each are an integer of one or more,
$R^6$ represents hydrogen, halogen, a branched or unbranched $C_{1-30}$ alkyl or alkylene group, a branched or unbranched $C_{2-30}$ alkenyl or alkenylene group, a branched or unbranched $C_{2-30}$ alkynyl or alkynylene group, or a group obtained by replacing a terminal hydrogen of the alkyl or alkenyl group with a hydroxy or carboxyl group,
$R^7$ represents hydrogen, a branched or unbranched $C_{1-30}$ alkylene or alkyl group, a branched or unbranched $C_{2-30}$ alkenylene or alkenyl group, or a branched or unbranched $C_{2-30}$ alkynylene or alkynyl group, and
$R^6$ and $R^7$ may form a ring structure together.
11. The rubber composition for a tire according to claim 1, further comprising carbon black.
12. The rubber composition for a tire according to claim 1, which is used for a tread of a heavy-load tire.
13. A heavy-load tire, comprising
a tread produced from the rubber composition according to claim 1.
14. A heavy-load tire, comprising
a tread produced from the rubber composition according to claim 2.
15. A heavy-load tire, comprising
a tread produced from the rubber composition according to claim 3.
16. A heavy-load tire, comprising
a tread produced from the rubber composition according to claim 7.
17. A heavy-load tire, comprising
a tread produced from the rubber composition according to claim 10.

* * * * *